(12) United States Patent
Kitashou (10) Patent No.: US 8,014,629 B2
(45) Date of Patent: Sep. 6, 2011

(54) IMAGE PROCESSING APPARATUS AND METHOD

(75) Inventor: Tetsurou Kitashou, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1041 days.

(21) Appl. No.: 11/843,293

(22) Filed: Aug. 22, 2007

(65) Prior Publication Data

US 2008/0050045 A1     Feb. 28, 2008

(30) Foreign Application Priority Data

Aug. 25, 2006  (JP) ................. 2006-229684

(51) Int. Cl.
*G06K 9/36* (2006.01)
*G06K 9/32* (2006.01)

(52) U.S. Cl. ...................... 382/276; 382/298
(58) Field of Classification Search .......... 382/298, 382/276; 345/660
See application file for complete search history.

(56) References Cited

U.S. PATENT DOCUMENTS

| 4,338,673 | A | * | 7/1982 | Brown | 345/469 |
| 5,579,405 | A | * | 11/1996 | Ishida et al. | 382/197 |
| 5,754,304 | A |   | 5/1998 | Endo et al. | 358/298 |
| 5,841,439 | A | * | 11/1998 | Pose et al. | 345/418 |
| 6,133,914 | A | * | 10/2000 | Rogers et al. | 345/661 |
| 6,252,608 | B1 | * | 6/2001 | Snyder et al. | 345/473 |
| RE38,078 | E | * | 4/2003 | Duluk, Jr. | 345/422 |
| 6,642,935 | B1 | * | 11/2003 | Soga | 345/660 |
| 6,762,762 | B2 | * | 7/2004 | MacInnis et al. | 345/503 |
| 7,009,626 | B2 | * | 3/2006 | Anwar | 345/660 |
| 7,234,111 | B2 | * | 6/2007 | Chu et al. | 715/251 |
| 2001/0038390 | A1 | * | 11/2001 | Takaya et al. | 345/671 |
| 2002/0113814 | A1 | * | 8/2002 | Brouard et al. | 345/723 |
| 2004/0044468 | A1 | * | 3/2004 | Adachi | 701/208 |
| 2005/0226538 | A1 | * | 10/2005 | Di Federico et al. | 382/299 |
| 2006/0072017 | A1 | * | 4/2006 | Zhang et al. | 348/207.99 |
| 2008/0018671 | A1 | * | 1/2008 | Miake et al. | 345/661 |
| 2009/0189903 | A1 | * | 7/2009 | Imai et al. | 345/467 |

FOREIGN PATENT DOCUMENTS

| JP | 7-107272 | 4/1995 |
| JP | 2002-197016 A | 7/2002 |
| JP | 2004-102998 A | 4/2004 |

* cited by examiner

*Primary Examiner* — Vikkram Bali
*Assistant Examiner* — Michelle Entezari
(74) *Attorney, Agent, or Firm* — Fitzpatrick, Cella, Harper & Scinto (57) ABSTRACT

An image processing apparatus capable of reducing frame loss and smoothly playing back vector data-based images is provided. A determination unit determines an intermediate rendering size smaller than a display rendering size by using vector data and its frame rate. A generation unit generates intermediate raster data by rendering at the intermediate rendering size determined by the determination unit. A scaling unit scales up the intermediate raster data generated by the generation unit to the display rendering size.

7 Claims, 6 Drawing Sheets

IMAGE PROCESSING APPARATUS AND METHOD

BACKGROUND OF THE INVENTION

1. Field of the Invention

The present invention relates to an image processing technique and, more particularly, to an image processing technique suitable for rendering vector data.

2. Description of the Related Art

In rendering vector data, a larger rendering image size leads to a larger number of translucently composited pixels and a larger number of edge pixels to be tracked, which prolongs the rendering process time. Highly complex vector data and a large number of objects also prolong the rendering process time.

Even if rendering takes a long time, a printer can decrease the printing speed in accordance with the rendering speed by printing upon completion of rendering or rendering data on each scan line in the printing direction, as disclosed in Japanese Patent Laid-Open No. 7-107272.

However, when playing back an animation made up of vector data, rendered images must be successively output at a specified frame rate. The animation may contain a frame that has not completely been rendered within an allowed time per frame, resulting in frame loss in playback of the animation, and failing to successively display images at a specified frame rate.

SUMMARY OF THE INVENTION

The present invention has been made to solve the above-described problems, and has as its object to reduce frame loss and smoothly play back vector data-based images.

According to one aspect of the present invention, an image processing apparatus capable of reducing frame loss and smoothly playing back vector data-based images is provided. A determination unit determines an intermediate rendering size smaller than a display rendering size by using vector data and its frame rate. A generation unit generates intermediate raster data by rendering at the intermediate rendering size determined by the determination unit. A scaling unit scales up the intermediate raster data generated by the generation unit to the display rendering size.

Further features of the present invention will become apparent from the following description of exemplary embodiments, with reference to the attached drawings.

DESCRIPTION OF THE EMBODIMENTS

Various exemplary embodiments, features, and aspects of the present invention will be described in detail below with reference to the drawings.

Figure 1:
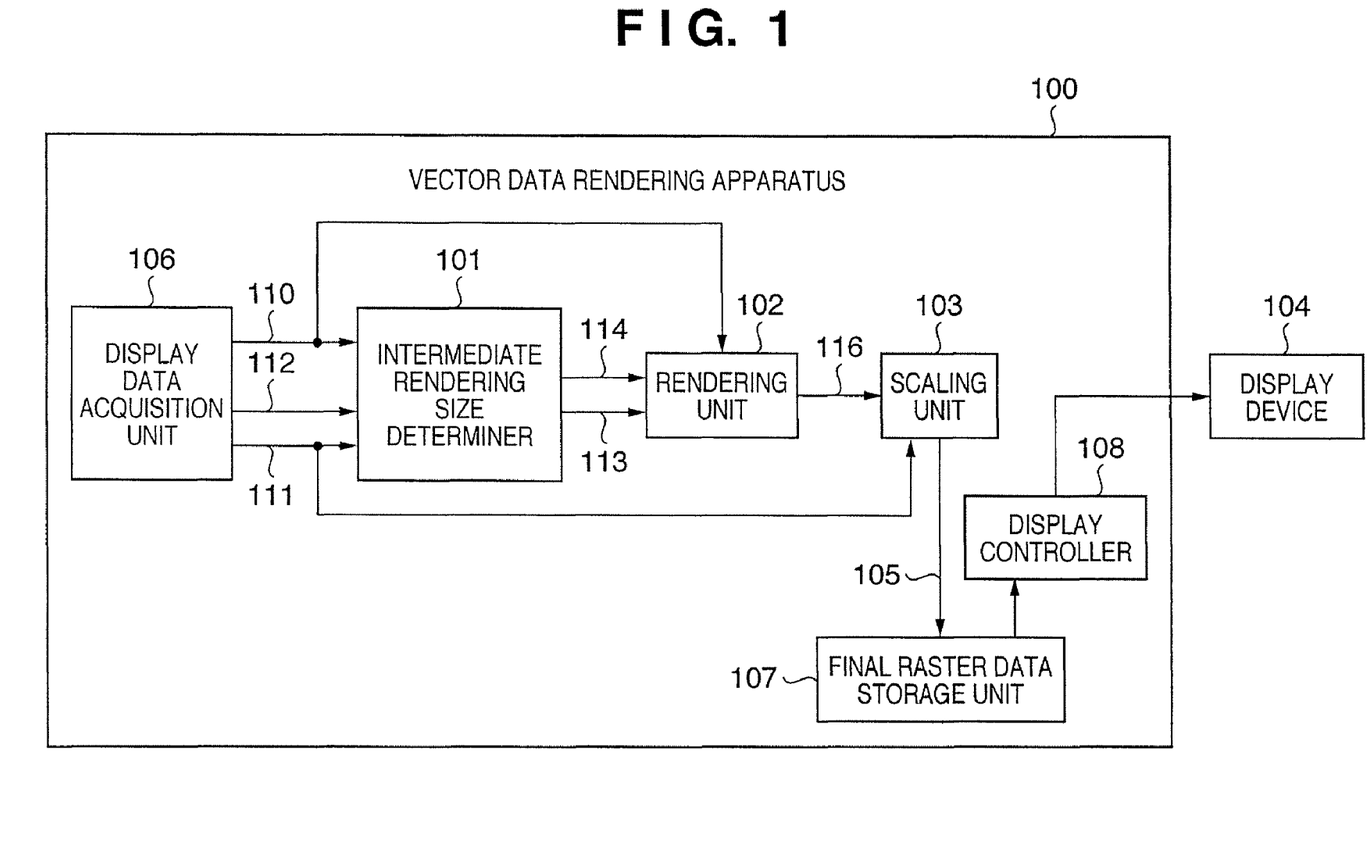
FIG. 1 is a block diagram showing a functional arrangement of a vector data rendering apparatus according to an embodiment of the present invention.

FIG. 1 is a block diagram showing a functional arrangement of a vector data rendering apparatus according to an embodiment of the present invention. In FIG. 1, a vector data rendering apparatus 100 comprises an intermediate rendering size determiner 101, a rendering unit 102, a scaling unit 103, a final raster data storage unit 107, a display data acquisition unit 106, and a display controller 108.

The vector data rendering apparatus 100 forms an image based on display vector data 110 at a display rendering size 111, and plays back an animation at a specified frame rate 112.

The display data acquisition unit 106 acquires the vector data 110, the display rendering size 111, and the frame rate 112 by, e.g., loading each respective piece of information from a storage medium that is installed in the vector data rendering apparatus 100.

The vector data 110 is an object corresponding to one animation frame, and includes an object list described in the vector form. The display rendering size 111 represents the output size of the animation. The frame rate 112 represents the number of display objects to be rendered per unit time.

The intermediate rendering size determiner 101 receives the vector data 110, the display rendering size 111, and the frame rate 112, from the display data acquisition unit 106. In addition to the specified data, the intermediate rendering size determiner 101 receives a rendering ability 113 of the rendering unit 102 from the rendering unit 102. The rendering ability 113 includes the number of edge pixels trackable per unit time by the rendering unit 102, the number of pixels translucently compositable per unit time by the rendering unit 102, and the number of buffers incorporated in the hardware of the rendering unit 102.

Figure 2:
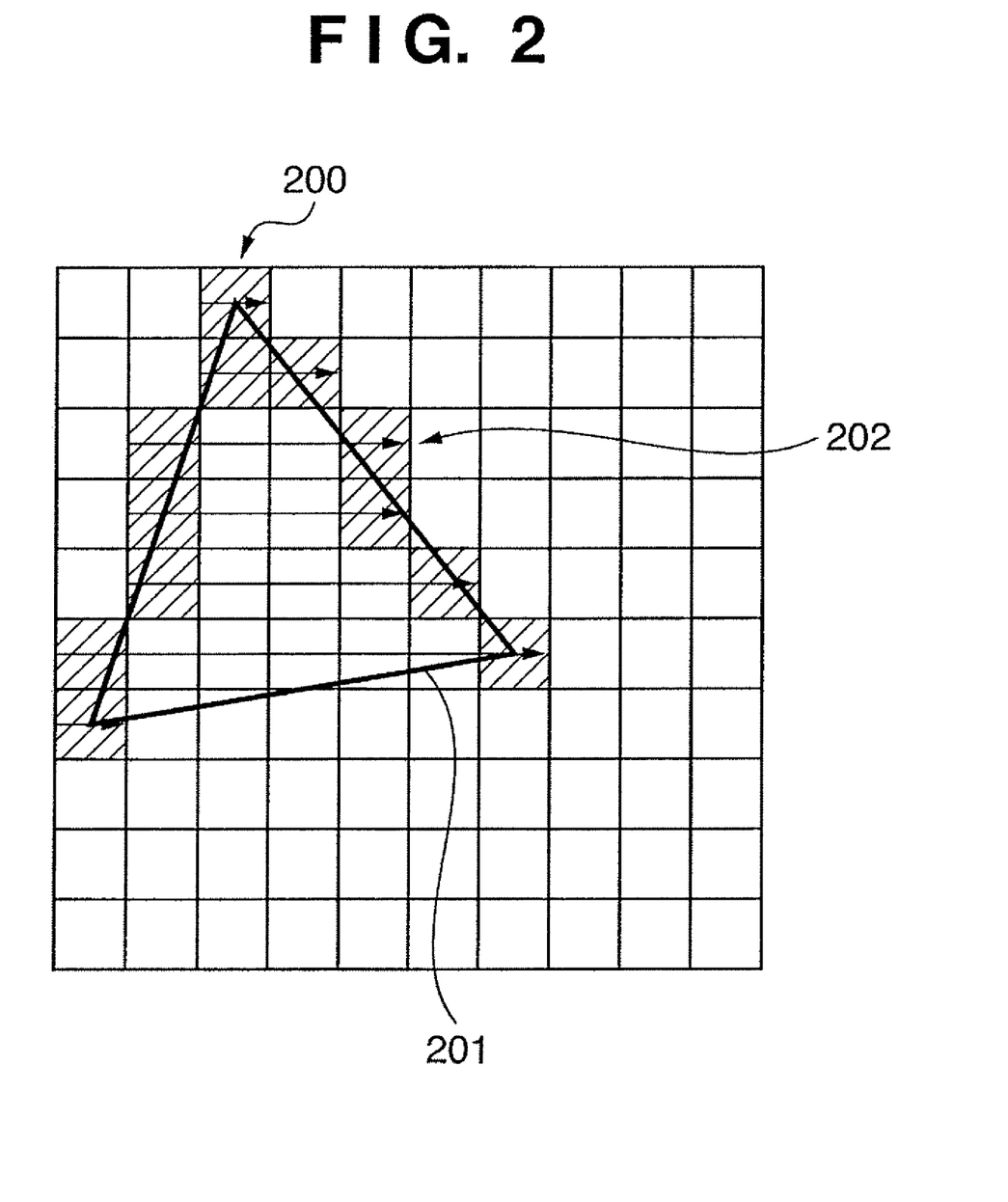
FIG. 2 is a view showing a relationship between an edge pixel, an object, and a scan line according to the embodiment of the present invention.

FIG. 2 is a view showing a relationship between an edge pixel, an object, and a scan line. FIG. 2 exemplifies a rendering image of a single object. Scan lines (right arrows in FIG. 2) 202 are along the horizontal direction. According to the embodiment, as shown in FIG. 2, edge pixels 200 are (gray) pixels which first cross constituent lines (edge lines) of an object 201.

Figure 3:
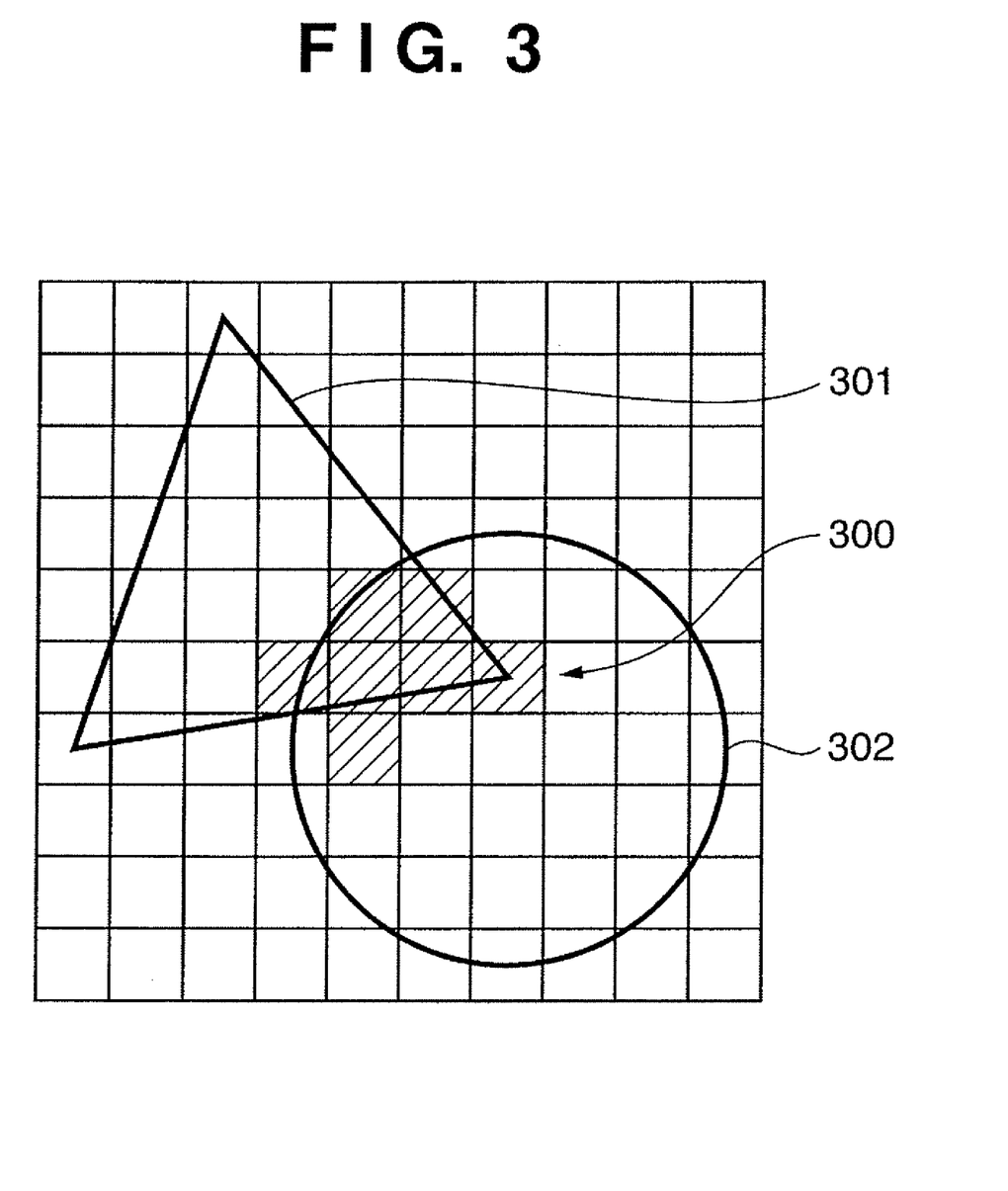
FIG. 3 is a view showing an example of translucently composited pixels according to the embodiment of the present invention.

FIG. 3 is a view showing an example of translucently composited pixels. FIG. 3 exemplifies a rendering image of objects. According to the embodiment, as shown in FIG. 3, translucently composited pixels exist at a gray portion 300 in FIG. 3 generated upon translucently compositing a triangular object 301 and circular object 302. No translucent composition is done when an overlaying one of the two objects 301 and 302 is not transparent. In this case, no translucently composited pixel exists, unlike FIG. 3.

Referring back to FIG. 1, the intermediate rendering size determiner 101 calculates an intermediate rendering size 114 on the basis of the vector data 110, the display rendering size 111, and the frame rate 112, and the rendering ability 113 of the rendering unit 102.

That is, the intermediate rendering size determiner 101 estimates a maximum image size at which the rendering unit 102 can render the vector data 110 within the time allowed to render one frame.

More specifically, the intermediate rendering size determiner 101 analyzes the vector data 110, and counts the number of rendering objects in the vector data 110. The intermediate rendering size determiner 101 temporarily renders the vector data 110 at an arbitrary size smaller than the display rendering size 111, on the basis of the number of counted rendering objects. Temporary rendering is a process to obtain the numbers of edge pixels and translucently composited pixels and the like in the vector data 110. In temporary rendering, no actual process such as translucent composition is done. The process ends upon calculating the numbers of edge pixels and translucently composited pixels and the like in the vector data 110.

Then, the intermediate rendering size determiner 101 counts the numbers of edge pixels and translucently composited pixels and the like from the temporary rendering result. The intermediate rendering size determiner 101 estimates the numbers of edge pixels and translucently composited pixels and the like at the display rendering size 111 by using the numbers of counted edge pixels and counted translucently composited pixels and the like.

According to the embodiment, it is presumed that the numbers of edge pixels and translucently composited pixels are proportional to the display rendering size 111. The numbers of edge pixels and translucently composited pixels at the display rendering size 111 are approximated by multiplying, by a constant, the numbers of edge pixels and translucently composited pixels counted from the temporary rendering result.

Thereafter, the intermediate rendering size determiner 101 calculates a maximum image size at which the rendering unit 102 can render a target image within the time allowed to render one frame. The image size is calculated on the basis of, e.g., the number of objects in the vector data 110, the number of edge pixels, the number of translucently composited pixels, and the rendering ability 113.

If the calculated image size is greater than or equal to the display rendering size 111, the rendering unit 102 can execute all processes to form a target image at the display rendering size 111. Thus, the intermediate rendering size determiner 101 outputs the display rendering size 111 as the intermediate rendering size 114 to the rendering unit 102.

If the calculated image size is smaller than the display rendering size 111, the rendering unit 102 cannot execute all processes to form a target image at the display rendering size 111. Thus, the intermediate rendering size determiner 101 outputs, as the intermediate rendering size 114, the maximum image size at which the rendering unit 102 can render a target image within the time allowed to render one frame. According to the embodiment, the intermediate rendering size determiner 101 performs the process every predetermined time to calculate the intermediate rendering size 114.

The rendering unit 102 generates intermediate raster data 116 by rendering and rasterizing the vector data 110, which is received from the display data acquisition unit 106, at the intermediate rendering size 114, which is received from the intermediate rendering size determiner 101. The intermediate raster data 116 has a size less than or equal to the display rendering size 111. Accordingly, generation of the intermediate raster data 116 is completed within the time allowed for the rendering unit 102 to render one frame.

The scaling unit 103 scales up the intermediate raster data 116 generated by the rendering unit 102 to the display rendering size 111, thus generating final raster data 105. If necessary, the scaling unit 103 stores the final raster data 105 in the final raster data storage unit 107. The intermediate raster data 116 has a size less than or equal to the display rendering size 111. The scaling unit 103 can provide final output raster data (final raster data 105) by scaling up the intermediate raster data 116 to the display rendering size 111.

When the size of the intermediate raster data 116 equals the display rendering size 111, the scaling unit 103 stores the received intermediate raster data 116 as the final raster data 105 in the final raster data storage unit 107, without scaling up the intermediate raster data 116.

The display controller 108 outputs the final raster data 105 thereby generated to a display device 104 having a display such as a liquid crystal display (LCD). The display device 104 successively displays the final raster data 105 at the specified frame rate 112 to play back an animation contained in the vector data 110.

Figure 4A:
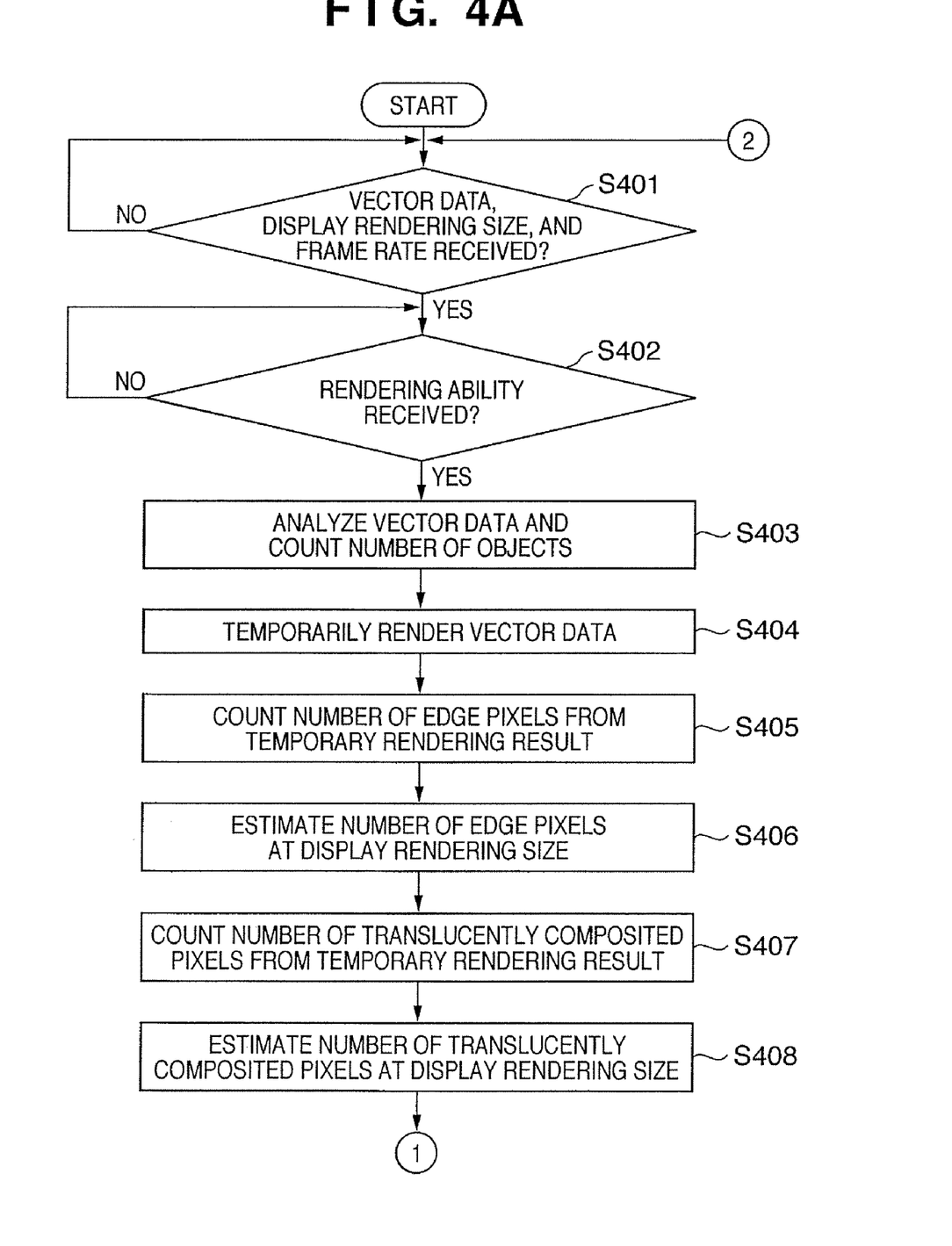
FIGS. 4A and 4B are flowcharts showing a process by an intermediate rendering size determiner according to the embodiment of the present invention.

A process performed by the intermediate rendering size determiner 101 will be described with reference to the flowcharts of FIGS. 4A and 4B. In step S401 of FIG. 4A, the intermediate rendering size determiner 101 waits for input of the vector data 110, the display rendering size 111, and the frame rate 112, from the display data acquisition unit 106. Upon receiving the vector data 110, the display rendering size 111, and the frame rate 112 from the display data acquisition unit 106, the process advances to step S402.

In step S402, the intermediate rendering size determiner 101 waits for input of the rendering ability 113 of the rendering unit 102 from the rendering unit 102. Upon receiving the rendering ability 113 from the rendering unit 102, the process advances to step S403.

In step S403, the intermediate rendering size determiner 101 analyzes the vector data 110 received in step S401, and counts the number of objects in the vector data 110 on the basis of the analysis result.

In step S404, the intermediate rendering size determiner 101 temporarily renders the vector data 110 received in step S401 on the basis of the number of objects counted in step S403. As described above, an image size obtained by temporary rendering is an arbitrary one that is smaller than the display rendering size 111 received in step S401.

In step S405, the intermediate rendering size determiner 101 counts the number of edge pixels on the basis of the temporary rendering result in step S404. In step S406, the intermediate rendering size determiner 101 multiplies the number of edge pixels counted in step S405 by a constant, and estimates the number of edge pixels at the display rendering size 111.

In step S407, the intermediate rendering size determiner 101 counts the number of translucently composited pixels on the basis of the temporary rendering result in step S404. In step S408, the intermediate rendering size determiner 101 multiplies by a constant the number of translucently composited pixels counted in step S407, and estimates the number of translucently composited pixels at the display rendering size 111.

Figure 4B:
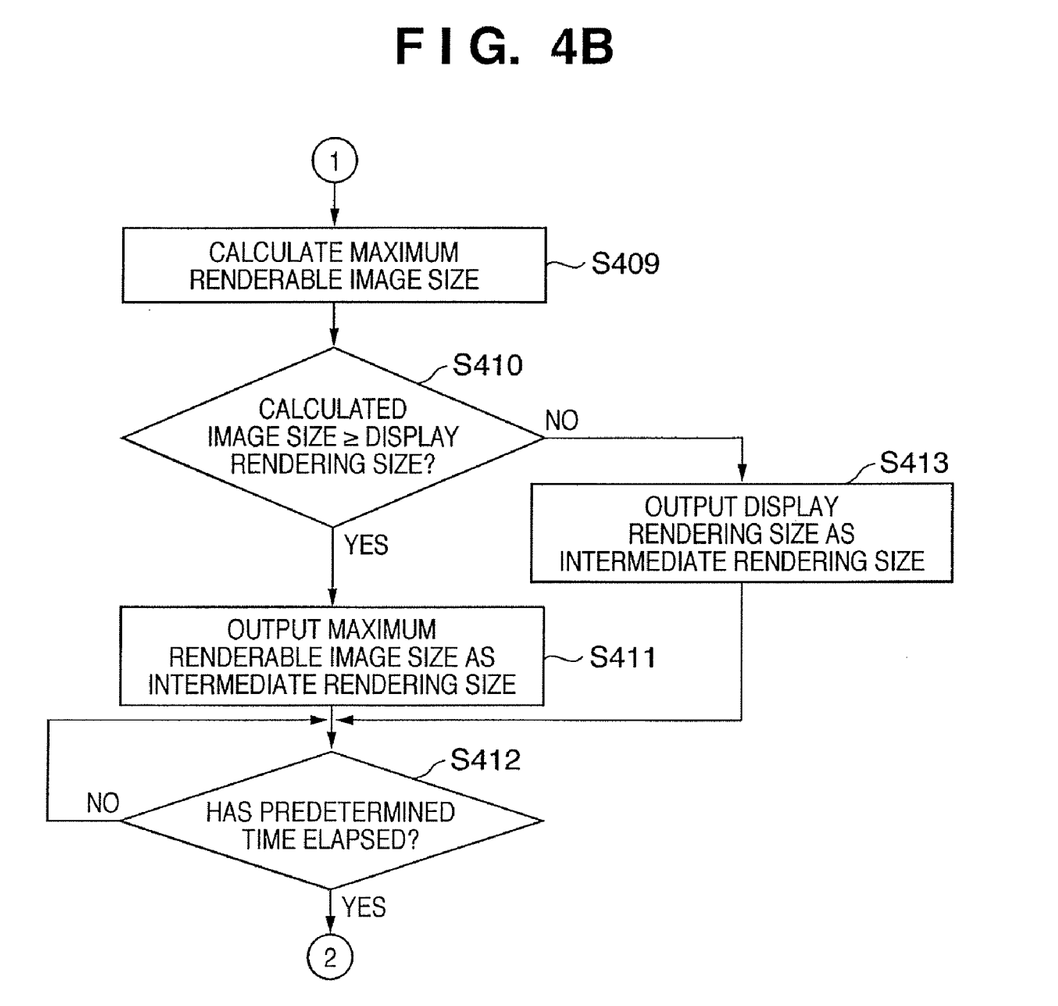

In step S409 of FIG. 4B, the intermediate rendering size determiner 101 calculates a maximum image size at which the rendering unit 102 can render a target image within the time allowed to render one frame. This image size is calculated on the basis of, e.g., the number of objects counted in step S403, the number of edge pixels estimated in step S406, the number of translucently composited pixels estimated in step S408, and the rendering ability 113 received in step S402.

In step S410, the intermediate rendering size determiner 101 determines whether the image size calculated in step S409 is greater than or equal to the display rendering size 111 received in step S401. If the intermediate rendering size determiner 101 determines that the image size calculated in step S409 is smaller than the display rendering size 111 received in step S401, the process advances to step S413, to be described hereinafter.

If the image size calculated in step S409 is greater than or equal to the display rendering size 111 received in step S401, the rendering unit 102 cannot execute all processes to form a target image at the display rendering size 111. In step S411, therefore, the intermediate rendering size determiner 101 outputs, as the intermediate rendering size 114 to the rendering unit 102, the maximum image size at which the rendering unit 102 can render a target image within the time allowed to render one frame.

In step S412, the intermediate rendering size determiner 101 waits for the lapse of a predetermined time after outputting the intermediate rendering size 114. Upon the lapse of the predetermined time, the process returns to step S401 in FIG. 4A, and the intermediate rendering size determiner 101 calculates the intermediate rendering size 114 again. If the intermediate rendering size determiner 101 determines in step S410 that the image size calculated in step S409 is smaller than the display rendering size 111 received in step S401, the rendering unit 102 can execute all processes to form a target image at the display rendering size 111. Hence, in step S413, the intermediate rendering size determiner 101 outputs the display rendering size 111 received in step S401 as the intermediate rendering size 114 to the rendering unit 102.

Figure 5:
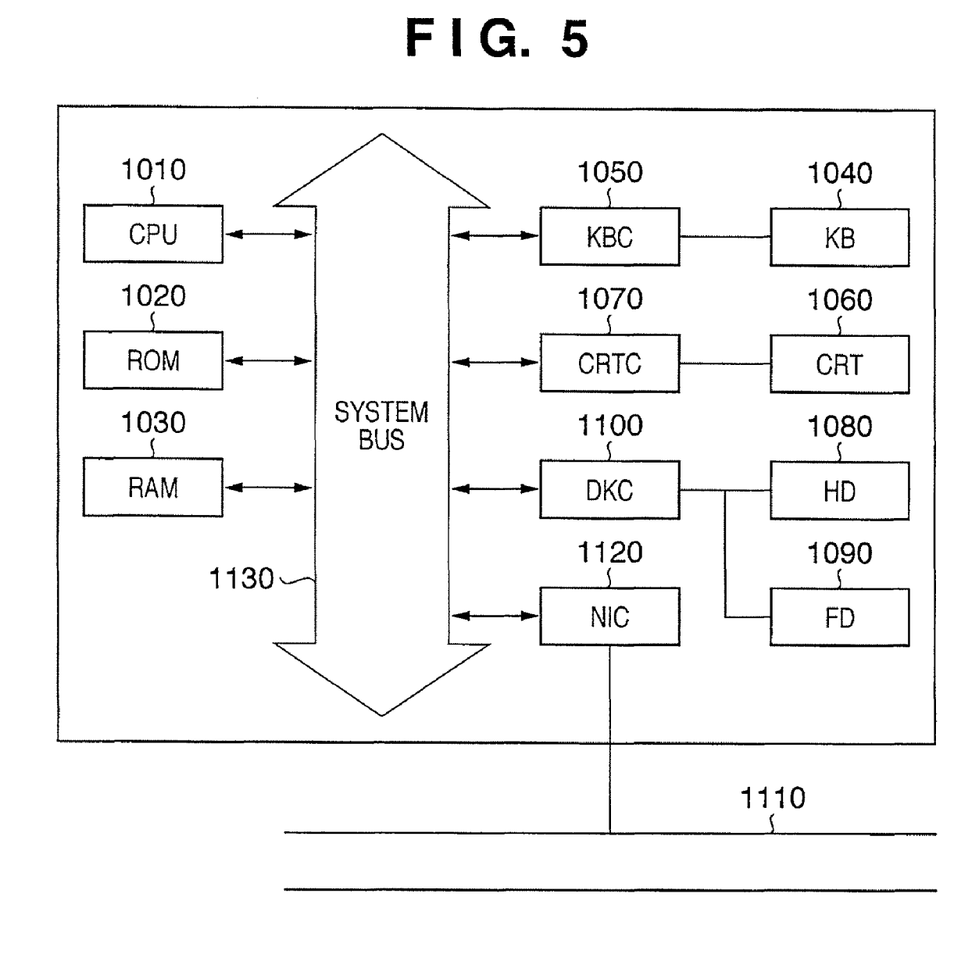
FIG. 5 is a block diagram showing a hardware configuration in the vector data rendering apparatus according to the embodiment of the present invention.

FIG. 5 is a block diagram showing a hardware configuration in the vector data rendering apparatus 100 for executing the above-described process. In FIG. 5, a CPU 1010, a ROM 1020, a RAM 1030, and a keyboard controller (KBC) 1050 of a keyboard (KB) 1040 are connected to a system bus 1130. A CRT controller (CRTC) 1070 of a CRT display (CRT) 1060, which serves as a display unit, is connected to the system bus 1130. A disk controller (DKC) 1100 of a hard drive (HD) 1080 and a floppy disk drive (FD) 1090 is also connected to the system bus 1130. A network interface controller (NIC) 1120, for connection to a network 1110, is further connected to the system bus 1130.

The CPU 1010 controls all building units connected to the system bus 1130 by executing software stored in the ROM 1020 or the HD 1080, or software supplied from the FD 1090. In other words, the CPU 1010 controls to achieve the operation by loading a process program from the ROM 1020, the HD 1080, or the FD 1090, which complies with a predetermined process sequence, and executing the program.

The RAM 1030 functions as a main memory for the CPU 1010, and provides a work area thereof. The KBC 1050 controls an instruction input from the KB 1040, a pointing device (not shown), or the like.

The CRTC 1070 controls display of the CRT 1060. The DKC 1100 controls access to the HD 1080 and FD 1090, which store a boot program, various applications, edit files, user files, network management programs, predetermined process programs according to the embodiment, and the like. The NIC 1120 exchanges data with a device or system on the network 1110 in two ways.

As described above, two image forming means, i.e., the rendering unit 102 and scaling unit 103, are adopted according to the embodiment. The intermediate rendering size determiner 101 adjusts the ratio of processes by the rendering unit 102 and scaling unit 103. An image of vector data requiring a long rendering process time is formed by increasing the process ratio of the scaling unit 103. The image can be formed within the time allowed to form a 1-frame image, without experiencing frame dropout.

More specifically, according to the embodiment, the intermediate rendering size determiner 101 calculates a maximum image size at which the rendering unit 102 can render a target image within the time allowed to render one frame. If the image size is smaller than the display rendering size 111, the intermediate rendering size determiner 101 outputs, as the intermediate rendering size 114, the maximum image size at which the rendering unit 102 can render a target image within the time allowed to render one frame. The rendering unit 102 renders the vector data 110 at the intermediate rendering size 114 to generate the intermediate raster data 116. The scaling unit 103 scales up the intermediate raster data 116 generated by the rendering unit 102 to the display rendering size 111, generating the final raster data 105.

The rendering unit 102 can thereby complete generation of the intermediate raster data 116 within the time allowed to render one frame. Scaling-up of the intermediate raster data 116 by the scaling unit 103 generally requires a smaller calculation amount than the calculation volume required in rendering, and can be executed parallel to rendering. Doing so implements a high-speed process vis-à-vis the hardware of the rendering unit 102 and scaling unit 103.

As a result, the time until the final raster data 105 is outputted after the vector data rendering apparatus 100 receives the vector data 110, and can be adjusted within a specified time allowed to render one frame. Even if the rendering unit 102 cannot complete rendering within the time allowed to render one frame, an animation can be played back without experiencing frame dropout.

Moreover, the intermediate rendering size 114 is calculated every predetermined time. The process time to render the vector data 110 varies every frame depending on the numbers of translucently composited pixels and edge pixels, the complexity of the vector data 110, the number of objects, and the like. Considering this, the intermediate rendering size 114 is calculated (updated) every predetermined time. Even if the process time to render the vector data 110 varies, each frame image can be formed as surely as possible within a specified time allowed to render one frame. This can more reliably prevent frame loss.

The intermediate rendering size 114 is calculated every predetermined time in the embodiment, but the present invention is not limited to this. For example, the intermediate rendering size determiner 101 may determine whether the structure of a rendering object in the vector data 110 has changed. Only when the structure of a rendering object in the vector data 110 has changed, the intermediate rendering size determiner 101 calculates the intermediate rendering size 114. This process further ensures formation of each frame image within a specified time allowed to render one frame even if the process time to render the vector data 110 varies. In this case, for example, step S412 in FIG. 4B is omitted, and whether the structure of a rendering object in the vector data 110 received in step S401 has changed is determined after step S401. If the structure of a rendering object in the vector data 110 received in step S401 has changed, the intermediate rendering size determiner 101 executes processes in step S402 and subsequent steps; otherwise, the process returns to step S401.

The intermediate rendering size determiner 101 receives the rendering ability 113 of the frame rate 112 from the frame rate 112 in the embodiment, but the present invention is not limited to this. For example, the rendering ability 113 of the rendering unit 102 may be registered in advance in the intermediate rendering size determiner 101.

A maximum image size at which the rendering unit 102 can render a target image within the time allowed to render one frame is compared with the display rendering size 111 in the embodiment, but the present invention is not limited to this. For example, it may be determined whether the sum of the number of objects in the vector data 110, and the numbers of edge pixels and translucently composited pixels estimated as described above is equal to or larger than a value indicated by the rendering ability 113.

In this case, the number of objects in the vector data 110 received in step S401, and the numbers of edge pixels and translucently composited pixels estimated in steps S406 and S408 are summed instead of step S409 in FIG. 4B. Instead of step S410, it is determined whether the sum of the numbers of objects, edge pixels, and translucently composited pixels is equal to or larger than a value indicated by the rendering ability 113. If it is determined that the sum exceeds the rendering ability 113, the process advances to step S411; otherwise, to step S413.

In the embodiment, the numbers of edge pixels and translucently composited pixels are obtained from a temporary rendering result. The intermediate rendering size 114 is determined on the basis of the numbers of edge pixels and translucently composited pixels and the number of objects in the vector data 110 (steps S404 to S411 and S413). However, information used to obtain the intermediate rendering size 114 is not limited to them. For example, the number of objects to be translucently composited may also be considered. For an image which need not undergo translucent composition, neither the number of translucently composited pixels nor that of objects to be translucently composited need be considered. The number of buffers in the hardware of the rendering unit 102, the type of image format contained in the vector data 110, or the object composition method (composition operation type) may also be taken into consideration.

According to the above-described embodiment of the present invention, vector data is rendered at an intermediate rendering size smaller than a display rendering size to generate intermediate raster data. The generated intermediate raster data is scaled up to the display rendering size. Even when no vector data can be rendered at the display rendering size within the time assigned to one frame, it can be rendered within the time. This process can reduce a state in which rendering of vector data does not end within the time assigned to one frame. Consequently, frame loss can be reduced, and a vector data-based image can be smoothly played back.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-229684, filed Aug. 25, 2006, which is hereby incorporated by reference herein in its entirety.

What is claimed is:

1. An image processing apparatus comprising:
   a determination unit configured to determine an intermediate rendering size smaller than a display rendering size by using vector data and a frame rate of the vector data;
   a generation unit configured to generate intermediate raster data by rendering at the intermediate rendering size determined by said determination unit; and
   a scaling unit configured to scale up the intermediate raster data generated by said generation unit to the display rendering size,
   wherein said determination unit temporarily renders the vector data at a size smaller than the display rendering size, and determines the intermediate rendering size by using a temporary rendering result.

2. The apparatus according to claim 1, wherein said determination unit temporarily renders the vector data at a size smaller than the display rendering size, uses the temporary rendering result to determine whether said generation unit can render the vector data at the display rendering size, and determines the intermediate rendering size in accordance with a determination result.

3. The apparatus according to claim 1, wherein said determination unit determines the intermediate rendering size again and dynamically changes the intermediate rendering size every predetermined time or when a rendering object in the vector data changes.

4. An image processing method comprising:
a determination step of determining an intermediate rendering size smaller than a display rendering size by using vector data and a frame rate of the vector data;
a generation step of generating intermediate raster data by rendering at the intermediate rendering size determined in the determination step; and
a scaling step of scaling up the intermediate raster data generated in the generation step to the display rendering size,
wherein in the determination step, the vector data is temporarily rendered at a size smaller than the display rendering size, and the intermediate rendering size is determined by using a temporary rendering result.

5. The method according to claim 4, wherein in the determination step, the vector data is temporarily rendered at a size smaller than the display rendering size, the temporary rendering result is used to determine whether the vector data can be rendered at the display rendering size in the generation step, and the intermediate rendering size is determined in accordance with a determination result.

6. The method according to claim 4, wherein in the determination step, the intermediate rendering size is determined again to dynamically change the intermediate rendering size every predetermined time or when a rendering object in the vector data changes.

7. A non-transitory computer-readable medium recorded with a program for causing a computer to execute the image processing method set forth in claim 4.

* * * * *